(No Model.) 2 Sheets—Sheet 1.

R. KENNEDY.
JIGGING MACHINE.

No. 468,111. Patented Feb. 2, 1892.

Witnesses
Geo. W. Loury.
John E. Wiles.

Inventor
Richard Kennedy
By H. G. Underwood
Attorney (No Model.) 2 Sheets—Sheet 2.
R. KENNEDY.
JIGGING MACHINE.
No. 468,111. Patented Feb. 2, 1892.
Fig. 3.
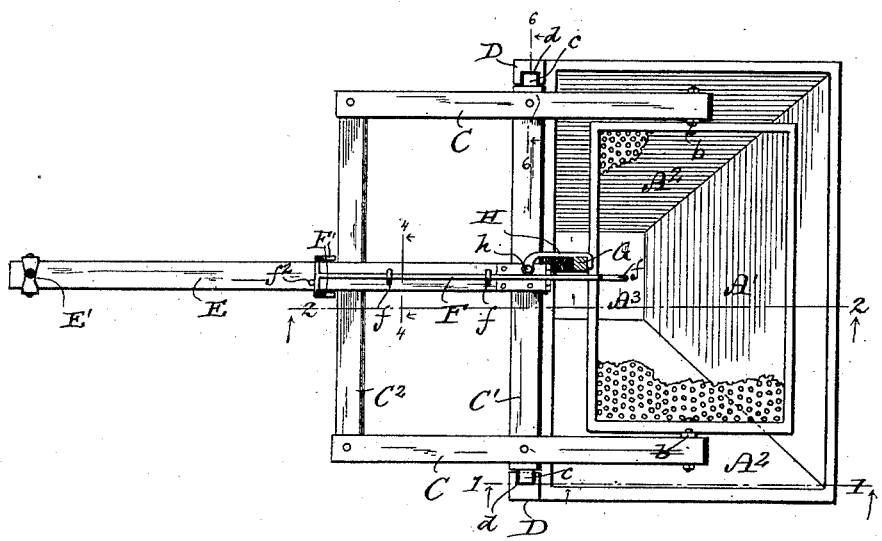
Fig. 4.
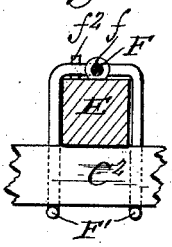
Fig. 5.
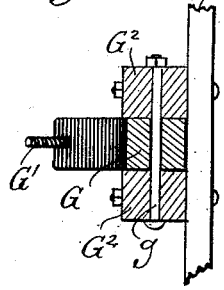
Fig. 6.
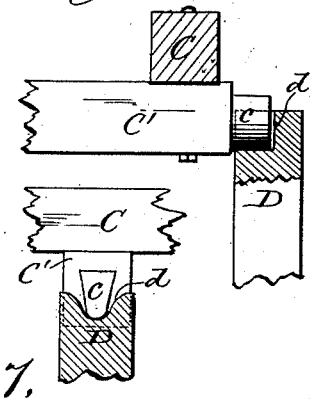
Fig. 7.
Witnesses
Geo. W. Young
John E. Wiles
Inventor
Richard Kennedy
By H. G. Underwood
Attorney

UNITED STATES PATENT OFFICE.

RICHARD KENNEDY, OF HIGHLAND, WISCONSIN.

JIGGING-MACHINE.

SPECIFICATION forming part of Letters Patent No. 468,111, dated February 2, 1892.

Application filed August 24, 1891. Serial No. 403,515. (No model.)

*To all whom it may concern:*

Be it known that I, RICHARD KENNEDY, a citizen of the United States, and a resident of Highland, in the county of Iowa, and in the State of Wisconsin, have invented certain new and useful Improvements in Jigging-Machines; and I do hereby declare that the following is a full, clear, and exact description thereof.

My invention relates to new and useful improvements in machines for cleaning ores, and relates more particularly to that class of machines known in the art as "jigging-machines."

The invention consists in the matters hereinafter described, and pointed out in the appended claims.

Figure 1:
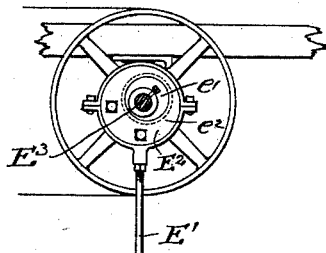
Figure 1:
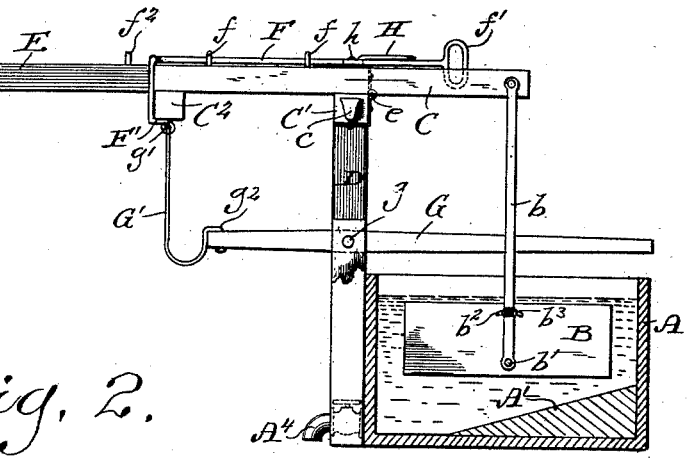
Figure 2:
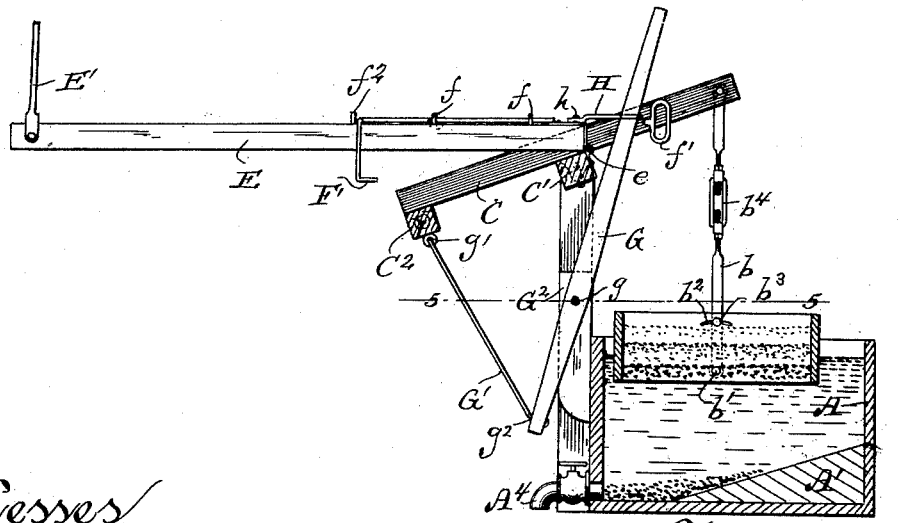

In the accompanying drawings, illustrating my invention, Figure 1 is a side elevation of a jigging-machine embodying my invention, showing portions broken away on line 1 1 of Fig. 3 to better illustrate the construction. Fig. 2 is a similar view, partly in section, on line 2 2 of Fig. 3, showing the parts in a changed position. Fig. 3 is a top plan view of the machine illustrated in Figs. 1 and 2 with parts broken away. Fig. 4 is a detail sectional view taken on line 4 4 of Fig. 3. Fig. 5 is another detail sectional view taken on line 5 5 of Fig. 2 of one of the parts. Fig. 6 is a detail sectional view taken on line 6 6 of Fig. 3. Fig. 7 is a detail sectional view taken on line 7 7 of Fig. 3.

In said drawings, A represents a trough or vat for containing water, and B a sieve into which the crushed ore is put to be cleaned, said sieve being suspended from a vibrating frame by means of hanger-arms $b\ b$, which are pivotally engaged with opposite ends of the sieve B, as at $b'\ b'$. Slots $b^2\ b^2$ are provided in the end walls of the sieve B, said slots being made in the form of arcs concentric with the pivotal connections $b'\ b'$. Bolts $b^3\ b^3$ are passed through the hanger-arms $b\ b$ and the slots $b^2\ b^2$, so as to firmly secure the sieve to said hanger-arms. By this construction the sieve B may be leveled sidewise by adjusting the bolts $b^3$ within the slots $b^2$. One of the hanger-arms $b$ is provided with suitable means for lengthening or shortening it—as, for instance, as shown in Fig. 2 of the drawings, in which said hanger-arm is shown as formed of two parts and the adjacent ends of said parts being screw-threaded and engaged with a turn-buckle $b^4$, by means of which said hanger-arm may be given a vertical adjustment, as may be desired, in order to level the sieve lengthwise.

The vibrating frame from which the hanger-arms $b\ b$ are suspended comprises two longitudinal frame pieces or beams C C, secured near their central portions to a transverse beam C', which is in turn suitably mounted in bearings formed in the upper ends of posts or standards D D. A second transverse beam $C^2$ is secured to the rear ends of the beams C C, as illustrated in Figs. 1 to 3 of the drawings, and a longitudinal beam or lever E is pivotally connected, as at $e$, with the central portion of the transverse beam C', and at its other end is secured to the lower end of a depending rod E', which is engaged by means of a suitable eccentric-strap at its upper end with an adjustable eccentric $E^2$. The particular form of this eccentric shown in the drawings comprises two portions $e'$ and $e^2$, the former made in the form of a small eccentric and secured to a suitable drive-shaft E and the latter being fitted around the periphery of said part $e'$ in such a manner as to be adjustable, so as to enable the operator to vary the throw of the eccentric, and thus give a greater or less amount of throw to the lever E, as may be desired. Any form of adjustable eccentric, such as are common to the trade, may obviously be employed for this purpose, (or even a plain eccentric,) and the particular construction of the eccentric forms no part of my present invention.

A longitudinally-movable rod F is secured to the upper side of the beam E by means of staples or clips $f\ f$, said rod being provided with a handle $f'$ at its forward end and bifurcated at its rear end and provided with depending hooks F' F', extending downwardly upon opposite sides of the lever E in such a manner as to be readily engaged with or disengaged from the transverse beam $C^2$ by a forward or a backward movement of the rod F. A stop $f^2$ is provided to limit the backward movement of the rod F.

A lever G is provided upon the frame of the machine, said lever being pivotally connected at $g$ with posts or supports $G^2\ G^2$, located at the rear of the tank A, and a flexible connection—such as a rope or chain G'—is engaged with the beam C² at one end, as at g', and at the other end with the rear end of the lever G. By this construction, when the depending hooks F' F' are moved backwardly out of engagement with the transverse beam C², the lever G may be operated to raise the sieve B from the water by an upward movement of the front end of said lever, so as to cause its rear end to pull downwardly upon the rope or chain G', and thus depress the rear end of the oscillating frame and rock said frame about its pivotal connections with the posts D D, thereby elevating the front end of said frame and lifting the sieve from the water. A hook H is pivoted to the frame, as at h, and is arranged to engage with the free end of the lever G to hold the same in its elevated position.

As illustrated in Figs. 1 to 3, inclusive, I prefer to construct the front and end portions of the bottom of the tank A upon an incline, as illustrated at A' and A² A², respectively, said inclined portions being converged toward the central rear part A³ of the bottom, and a valve-controlled outlet A⁴ is provided in the rear wall of said tank at this point. By this construction all sediment in the water contained in said tank will be caused to gravitate toward the outlet A⁴, so as to be readily drawn off when desired.

As shown more particularly in Figs. 6 and 7 of the drawings, the bearings of the transverse beam C' in the upper ends of the posts D D are conveniently formed by providing projecting shoulders c c upon the ends of the beam C', said shoulders being rounded upon their under sides and the upper ends of the posts D D being provided with recesses d d, within which the projecting shoulders c c are arranged to bear.

The operation of my improved machine is as follows: The ore, preparatory to being cleaned in the jigging-machine, is first crushed, then given a preliminary washing to remove the loose dirt, and then passed through a grading or sizing machine which is provided with a screen having several sections provided with perforations of different sizes. A number of jigging-machines equal to the number of different sizes or grades of ore are employed, the perforations in the bottom of the sieve in each machine being made a little smaller than the size or grade of ore which it is designed to clean. Four or more sizes or grades are usually employed. The operator places a quantity of ore of the proper size or grade in each of the jigging sieves, releases the lever G from the hook H, permits the sieve of each of the jigging-machines to descend into the water in the tank A, and then pulls the rod F forward, so as to engage the hooks F' F' beneath the transverse beam C², and thus locking the oscillating frame, which supports the sieve to the lever or beam E. The shaft E, carrying the eccentric E², is constantly revolved by suitable pulley and belt connections, and the lever E of each jigging-machine is thus constantly vibrated. When the sieve of one of the jigging-machines is lowered into the water by the described movement of the lever G and the oscillating frame, the vibrating movement of the lever E is communicated to said frame and the sieve suspended therefrom is given a quick vertical reciprocatory movement in the water. When, however, the lever G is raised and the sieve-supporting frame is rotated into the position shown in Fig 2, the vibrating movement of the beam or lever E does not affect said frame, as said lever E is permitted to vibrate freely from its hinged or pivotal connection e with the transverse beam C'. The quick up-and-down movement of the sieve in the water alternately causes sudden inflows and outflows of water through the perforations in the bottom of the sieve, thereby agitating the particles of the ore and other substances contained in said sieve and keeping said particles momentarily suspended in the water at each downward movement of the sieve. The heaviest particles of ore quickly settle to the bottom of the sieve, the next heaviest grades arranging themselves above, while the waste and all substances lighter than the ore are separated therefrom and either washed out of the sieve by the action of the water or deposited on the top of the lighter grades of ore in the sieve. When the ore in any one of the sieves has been sufficiently washed, the operator raises the lever G, so as to elevate the sieve B from the water in the manner before described, and then "skims" off the waste, if any, from the top of the ore and then removes in the same way the light grades of ore from off the heavy ore in the bottom of the sieve and then removes the heavy ore, leaving the sieve empty and ready for another charge of the crushed ore. More or less of the fine particles of good ore are separated from particles of waste by the described jigging operation and pass through the perforations in the bottom of the sieve into the tank A. After repeated operations of the jigging-machine, as before described, the accumulation of fine ore in the bottom of the tank A is drawn off through the valve-controlled outlet A⁴ and is subsequently cleaned in a jigging-machine having a very fine sieve.

By the described adjustable construction of the eccentric E² the operator is enabled to vary the eccentricity of the same, so as to give any desired amount of throw to the lever E, it being necessary to give the sieve a greater amount of throw in cleaning large than in cleaning small sizes of ores.

By my improved construction, the series of jigging-machines being operated by power, one workman is enable to attend to an entire series of said machines, it being only necessary for him to fill and to skim the sieves as required.

I am aware that automatic machines have been heretofore employed for washing ores; but in all such machines the washing has been effected by the agitation of the water and not by the movement of the sieve which contains the ore in the water. With such machines it is necessary to use a large amount of water, often more than can conveniently be obtained in the vicinity of a mine, while with my improved machine but little water is required.

A great disadvantage found in the aforesaid automatic machines for jigging ores has been that by their use much of the good ore is wasted if the process is prolonged sufficiently to produce a clean product, or if discontinued before any great amount of ore is lost it leaves the ore in a very unclean condition. It has therefore been necessary to jig the ore by hand in an ordinary hand-machine in order to do the work thoroughly and economically, as with the aforesaid automatic machines either more of the good ore is wasted than would pay for expert handwork or the ore is left in such an unclean condition that the difference in value between it and good clean ore would more than pay for hand-jigging. In the use of hand jigging-machines, however, the work is very laborious, and, moreover, one workman is only able to attend to a single machine, as he first fills the sieve, then operates the lever by hand, and then skims the ore. It will be seen, therefore, that my improved machine, while it is exceedingly simple in its construction, is at once cheap and durable, and at the same time greatly simplifies the work of cleaning the ore and enables a single workman to do the same amount of work as four or five workmen using the ordinary hand-machines.

I would have it understood that I do not desire to limit myself to the exact form of construction illustrated in the drawings and herein described, as various modifications may be made in the details of construction without departure from my invention.

Having described my invention, what I claim as new, and desire to secure by Letters Patent of the United States, is—

1. The combination, with a constantly-revolving shaft provided with an eccentric, of a frame pivotally supported in suitable bearings, a sieve suspended from said frame and arranged to hang within a tank containing water, a lever pivoted at one end to a stationary part of the machine and at its other end connected with said eccentric, and means for securing said pivoted frame to said lever, substantially as described.

2. The combination, with a constantly-revolving shaft provided with an eccentric, of a frame pivotally supported in suitable bearings, a sieve suspended from said frame and arranged to hang within a tank containing water, a lever pivoted at one end to a stationary part of the machine and at its other end connected with said eccentric, means for securing said pivoted frame to said lever, and means for raising and holding said sieve out of the water, substantially as described.

3. The combination, with a constantly-revolving shaft provided with an eccentric, of a frame pivotally supported in bearings, a sieve suspended from said frame and arranged to hang within a tank containing water, means for leveling said sieve, a lever pivotally connected at one end with a stationary part of the machine and at its other end connected with said eccentric, and suitable means for securing said pivoted frame to said lever, substantially as described.

4. In a jigging-machine, the combination, with a tank for holding water, of a frame journaled in suitable bearings, hanger-arms suspended from one end of said frame, one of said hanger-arms being provided with a turnbuckle or other adjusting device, a sieve connected with the lower ends of said hanger-arms, slots in the walls of said sieve adjacent to said connections, and bolts adjustably engaged within said slots and with said hanger-arms, substantially as described.

5. In a jigging-machine, the combination, with a tank for holding water, of an oscillating frame supported in suitable bearings, a sieve suspended from said frame by means of hanger-arms and arranged to hang within said tank, a lever pivotally connected at one end with a stationary portion of the machine, means for locking said oscillating frame to said lever, and suitable means connected with the other end of said lever for giving a constant vibrating motion thereto, substantially as described.

6. In a jigging-machine, the combination, with a constantly-revolving shaft provided with an eccentric, of a tank for holding water, an oscillating frame journaled above said tank in suitable standards, a sieve adjustably suspended from the front end of said frame and adapted to hang within said tank, a constantly-vibrating lever pivoted at one end to a suitable support and at the other end connected with said eccentric, a lifting-lever pivoted to a stationary part of the machine and connected with the rear end of said oscillating frame by means of a rope or chain, means for locking the rear end of said oscillating frame to said constantly-vibrating lever, and means for securing said lifting-lever in its elevated position, substantially as described.

In testimony that I claim the foregoing I have hereunto set my hand, at Highland, in the county of Iowa and State of Wisconsin, in the presence of two witnesses.

RICHARD KENNEDY.

Witnesses:
W. S. JENER,
PHIL ALLEN, Jr.